(12) United States Patent
Heller et al.

(10) Patent No.: US 6,302,161 B1
(45) Date of Patent: Oct. 16, 2001

(54) PROCESS FOR MIXING, DILUTING AND DISPENSING WATER DILUTABLE FORMULATIONS OF INSECTICIDES UTILIZING AN INJECTOR SYSTEM

(76) Inventors: Larry D. Heller, 460 Oak St., Osteen, FL (US) 32764; Allen W. Wooldridge, 312 Columbo Cir., Orlando, FL (US) 32804; William K. German, 888 Rte. 434, Greeley, PA (US) 18425

(*) Notice: Subject to any disclaimer, the term of this patent is extended or adjusted under 35 U.S.C. 154(b) by 0 days.

(21) Appl. No.: 09/757,911

(22) Filed: Jan. 10, 2001

Related U.S. Application Data

(60) Provisional application No. 60/175,548, filed on Jan. 11, 2000.

(51) Int. Cl.[7] .................................................. B65B 1/04
(52) U.S. Cl. ..................................... 141/9; 141/2; 141/18; 141/100
(58) Field of Search .................... 141/2, 18, 9, 100–104, 141/98, 67

(56) References Cited

U.S. PATENT DOCUMENTS

| | | | |
|---|---|---|---|
| 4,690,179 | * | 9/1987 | Bleth et al. ............................. 141/1 |
| 5,199,472 | * | 4/1993 | Rollison ................................. 141/65 |
| 5,584,327 | * | 12/1996 | Thomas et al. ....................... 141/104 |

* cited by examiner

Primary Examiner—Steven O. Douglas
(74) Attorney, Agent, or Firm—Frommer Lawrence & Haug LLP

(57) ABSTRACT

A process for mixing an insecticide formulation with an injector system that uses water to mix, dilute and dispense the insecticide. An injector system that includes a water dilutable formulation, a means of mixing or agitating the concentrated formulation, a water source, an injector for the purpose of diluting and mixing the formulation with water at pre-selected ratios, and a means for delivering the mixed and diluted formulation to application equipment used to reduce populations of insects, pests or other nuisance organisms of public health importance. A water dilutable formulation, an injector system and a process are combined in the present invention to provide an optional means of recirculating the insecticide concentrate in its container, drawing concentrate insecticide from the container and diluting and mixing it with water at selected concentrations which are calculated to meet the insecticide label application stipulations, and dispensing the correctly mixed solution directly into the application equipment (either aircraft, truck mounted or portable) selected for use. End-users then spray this mixture to mitigate infestations.

13 Claims, 1 Drawing Sheet

PROCESS FOR MIXING, DILUTING AND DISPENSING WATER DILUTABLE FORMULATIONS OF INSECTICIDES UTILIZING AN INJECTOR SYSTEM

RELATED APPLICATIONS

This application claims the benefit of pending provisional application Ser. No. 60/175,548 filed Jan. 11, 2000.

FIELD OF THE INVENTION

This invention relates to an injector system for preparing and distributing water dilutable insecticidal formulations and a process for mixing, diluting and dispensing an insecticidal formulation to be used for general insect control, especially mosquito control.

This injector system includes a formulation of a water dilutable insecticide, components for mixing or agitating the concentrated formulation, a water source, an injector for the purpose of diluting the formulation with water in preselected ratios, and a dispensing system for delivering the mixed and diluted formulation to application equipment. The injector system can be used to reduce populations of insects of public health concern or annoyance insects.

The injector system of the present invention can accurately mix and dilute insecticides with water in the proper proportions and dispense the diluted insecticide for subsequent application. Application equipment used to apply the diluted insecticide includes units such as ground ultra low volume (ULV) aerosol generators and portable spray units used for ground or aerial application.

The process for preparing the insecticidal formulation includes mixing the concentrated formulation in its container, drawing the formulation from the container and diluting it with water at selected concentrations which are calculated to meet the manufacturer's label application specifications, and dispensing the correctly mixed solution directly into the application equipment (for example, aircraft, truck mounted or portable/handheld sprayers) selected for use.

OBJECTS OF THE INVENTION

An object of the invention is to provide a process for mixing and diluting water dilutable insecticide formulations with water and dispensing the diluted insecticide. In the past, insecticides applied as space sprays are normally mixed and diluted with oil in order to form and to maintain the recommended droplet size once dispensed. The formulations used within the present invention allow the insecticide to be mixed and diluted with water while still forming and maintaining the recommended droplet size once dispersed.

It is a further object of this invention to provide an injector system that agitates the concentrated formulation and that accurately dilutes the formulation with the proper amount of water. The injector system also dispenses the diluted formulation directly into application equipment.

It is a further object of this invention to provide a container for the concentrated insecticidal formulation that could be returned to the manufacturer for refilling and that could optionally include a tamper evident device.

Other objects, features, and advantages of the invention will become apparent upon reading the following specification in conjunction with the accompanying figure.

BACKGROUND OF THE INVENTION

All documents discussed herein, and all documents in provisional application Ser. No. 60/175,548 filed Jan. 11, 1999, are hereby incorporated by reference.

Insect control in the United States, for example, mosquito control, is almost always done for the control of annoying biting insects and for disease prevention. The control and reduction of mosquito populations is done by either larviciding (killing larvae in the water in which they breed) or adult control using various insecticides.

Substantial efforts have been expended by a wide variety of entities in attempting to develop highly effective pesticides, particularly insecticides, which are capable of eradicating or controlling insects which destroy ornamental and agricultural plants, crops, and trees, or which attack, harm, or annoy humans and animals. Particularly bothersome to humans and animals are blood-sucking insects, such as mosquitoes, ticks, fleas, and lice. These insects are annoying as well as potentially harmful due to the potential transmission of diseases. It is not only for the suppression of disease that insect control is needed. There is a perennial call for abatement of the nuisance of insects, such as mosquitoes, which make unprotected outdoor activities all but impossible at certain seasons of the year in many parts of the world. Although substantial need has existed in the industry for products which control or eradicate these insects and for systems to effectively prepare these products for application, prior attempts have failed to provide systems that are optimized for the preparation of particular insecticidal formulations.

A number of injector devices have been used for dispensing chemical substances for a variety of applications. Such devices include the non-electric proportional injection systems, such as the DOSMATIC® injector available commercially from Dosatron International, Rue Pascal-BP-6, 33370 Tresse (Bordeaux), France, which operates without electricity by using water pressure as the power source. On its way through such a system, the water pressure activates the dispenser which takes up the required percentage of concentrate directly from the container and injects the concentrate into a fluid stream for dilution. These units are precise and relatively simple and have been used in a wide range of applications, including irrigation, livestock hygiene and crop spraying.

Other devices for mixing concentrated insecticides with a carrier, such as water, include the use of a variety of pumps. Pumps, including positive displacement pumps, vane pumps, rotary lobe pumps, or any type of metering pump, can be used to add a concentrated insecticidal formulation with a carrier. These pumps can be configured to pump a concentrated insecticide into a carrier such as oil or water. Alternatively, these pumps can be used to inject the concentrated insecticidal formulation into a water stream or a carrier stream, thereby diluting the concentrated insecticide when it mixes with the fluid stream.

Space spray insecticides are generally dispersed as ultra low volume (ULV) space treatments or fogs to kills adult mosquitoes. An insecticide is diluted and atomized by a ULV fogging machine. The insecticide would then be released from the ground or from the air. Air currents would carry the droplets downwind of the application equipment. The droplets would collide with the insects, coating the insect with a lethal dose of the active ingredient. A system for dispersing an insecticide in this manner is described in U.S. Pat. No. 5,248,448, entitled Aerosol Generator Apparatus with Control and Recording, and is hereby incorporated by reference.

Space spray aerosol insecticides, such as mosquito adulticides, are generally diluted with oil because this was the only carrier that distributed the insecticide accurately and evenly over a wide range of conditions. However, there are a number of disadvantages and problems associated with oil-based carriers. These include potential storage liability, environmental concerns, inconvenience and additional cost.

Water dilutable insecticides include formulations such as the FFAST™ (an acronym for Film Forming Aqueous Spray Technology) insecticide formulations described in this application, which allow for the use of water as a diluent. U.S. Pat. Nos. 5,466,458 and 5,527,823 describe insecticidal formulations suitable for dilution with water to form a space spray aerosol. These patents are hereby incorporated by reference.

It is generally less expensive and more desirable to have the option of using a water-based product. However, at ambient temperatures, conventional water-based sprays tend to evaporate quickly and fail to deliver the insecticide to the target insects or pests efficiently. To overcome this problem in the past, dispersing insecticides in water required the creation of large droplets. However, these large droplets did not drift efficiently and did not reach the target at all.

A formulation, such as the FFAST™ formulation, using long chain alcohol molecules to form a protective film around each droplet of insecticide as it leaves the nozzle of the sprayer, allows for the formation of droplets that do not evaporate too quickly and that efficiently deliver the insecticide to the target insect. The incorporation of long chain alcohols into the formulation provides a means of coating the individual droplets of insecticides when mixed with water so as to control the rate of evaporation. This film retards the evaporation of the droplets and they maintain the desired optimum size.

The FFAST™ insecticide formulations therefore offer the benefits of using water as a diluent with the performance of oil-based dilution. For example, AQUA-RESLIN® insecticide is a concentrated formulation of a water dilutable mosquito adulticide that has as its active ingredient the pyrethroid permethrin, synergized with piperonyl butoxide, and is formulated in such a way as to be diluted with water, as opposed to oils, for subsequent application. By using the process and injector system of the present invention, the end user has the economic benefit of being able to purchase a concentrated insecticide that can be easily diluted with water and has the benefit of limiting the risks normally associated with worker exposure to the oils previously used to dilute an insecticide.

A specific injector system that could mix the concentrated insecticide, accurately dilute the insecticide with water, and dispense water diluted insecticides has not been available. Further, a process for mixing, diluting and dispensing water soluble formulations of insecticides using an injector system as an ultra low volume (ULV) space spray aerosol for the control of mosquitoes has heretofore not been available.

Accordingly, a need remains for a process for preparing insecticides that can be diluted with water and for an injector system which can mix the concentrated insecticide, accurately dilute with water, and dispense the water diluted insecticidal formulation into application equipment, thereby eliminating the problems associated with the use of oil as a diluent or carrier of the insecticide. It is to this injector system and process for preparing an insecticide that the present invention is primarily directed.

DETAILED DESCRIPTION OF THE INVENTION

With the development of water dilutable insecticides, such as FFAST™ insecticides, came the need for a process for diluting and dispensing the water-based formulation by the use of an injector system that would properly mix and dilute the concentrated insecticide with water and that would dispense the water diluted insecticide into the application equipment. The present invention is directed to the process of mixing a formulation of a water dilutable insecticides, accurately diluting with water and dispensing the water diluted formulation, and the injector system.

The present invention is directed to a process that includes the steps of: agitating, recirculating, mixing or re-suspending the water dilutable insecticide formulation within a container; drawing the water dilutable formulation from the container and accurately diluting the insecticide with water at concentrations selected to meet the manufacturer's label application specifications; and dispensing the water diluted insecticide directly into the application equipment (for example, aircraft, truck mounted or portable) selected for use.

The present invention is also directed to a specific type of injector system that is used to mix, dilute and dispense an insecticide with water. The injector system includes: a container and a mixing system for mixing the concentrated insecticide; a water source and a water stream through the injector system; a water injection pump for accurately injecting a predetermined amount of the insecticide into the water stream; and a dispensing system for dispensing the water diluted insecticide into application equipment.

The injector system can properly mix the concentrated insecticide, properly dilute the insecticide with water and dispense the water diluted insecticide into the application equipment. This is accomplished by providing a means for mixing, agitating, re-circulating or re-suspending the concentrated formulation to assure a homogeneous state, and then diluting the insecticide by injecting the insecticide into a water stream at a specified rate, which results in a pre-selected concentration of the insecticide. Once mixed and diluted, the injector system provides a means for dispensing the solution into application equipment for subsequent dispersal.

The injector system can optionally include a tamper-evident container. The container of the injector systems can also optionally be returnable to the manufacturer for refilling with the concentrated insecticide.

The injector system of the present invention for preparing a water dilutable insecticidal formulation includes: a container having an inlet and an outlet for holding the water dilutable insecticidal formulation prior to dilution with water; a mixing system for mixing the water dilutable insecticidal formulation in the container prior to dilution; a water source; a water injection pump; a water line connecting the water outlet port of the water injector pump to a dispensing system; a fluid line connecting the water dilutable insecticidal formulation outlet of the water injection pump and the water line, whereby the water injector pump injects a predetermined amount of the water dilutable insecticidal formulation into the water stream forming a final water diluted insecticidal formulation; and a dispensing system connected to the water line for dispensing the final water diluted insecticidal formulation into application equipment.

Prior to each dispensing event utilizing the injector system, the insecticide concentrate may need to be re-circulated within its container to assure proper performance of the formulation of the concentrate. The amount of time of recirculation will vary according to the amount of concentrate remaining in the container and the manufacturer's instructions. Recirculation insures that the concentrated insecticide (for example, AQUA-RESLIN® or other FFAST™ formulated insecticides) is uniformly mixed prior to being drawn out of the container to the injector and injected into the water stream.

The injector system of the present invention may include a re-circulation loop for re-circulating or agitating the insecticide. The injector system may include a water stream, a concentrate injector to inject concentrate into the water stream and a dispensing system to allow for filling of the application equipment. As a further embodiment, the injector system may include a concentrate recirculation loop incorporating the insecticide concentrate container, a recirculation pump, and a three-way valve to divert the flow of the concentrate from the recirculation loop to the injector.

The injector system requires a water source that can be from a standard water line. The connection between the water source and the injector systems may include a check valve to prevent the backflow of the water after injection of the concentrated insecticide, a pressure reducer if required, an inlet or shut-off valve for restricting the water flow when the injector is not in operation, a pressure gauge, and a water line allowing the water stream to pass to the dispensing system of the injector system. The injector system allows for the injection of concentrate into the water stream for mixing and prior to dispensing.

In the injector system with a three way valve in the recirculation loop, the valve is oriented to allow the concentrate to be injected into the water stream by diverting flow from the recirculation loop to the injector in the injector system. The injector would inject concentrated insecticide at a pre-selected rate into the water stream, thereby diluting and mixing the insecticide with water. A dispensing system on the outlet side of the injector system allows the water/insecticide solution to pass through the dispensing system into the application equipment. The dispensing system may include a nozzle and valve, and a flow meter. The dispensing system of the injector system may optionally include a bypass loop to be used for flushing the system after use.

The injector system may also include an agitation system that includes a mixing unit is incorporated into the concentrated insecticide container. One example of a mixing unit that is an integral part of the container includes a rotary mixer with the shaft of the mixer extending outward from the inside of the container. In this example, the end of the shaft of the rotary mixer inside the container includes a mixing head. The operator would then attach a mixing motor onto the shaft of the mixing unit on the outside of the container to turn the rotary mixer. This allows the concentrated insecticide to be mixed in the container without the use of a recirculation loop and pump. The motor could be connected with a standard quick connect coupling between the shaft of the mixer and the drive shaft of the motor. If the mixing unit is incorporated into the container, the container would require only one outlet since the inlet port and the outlet port required for a recirculation loop would not be required. A tamperproof or tamper-evident device could be included in a container with only one port. These containers with a single outlet can also be designed to be product specific, whereby different concentrated insecticides could be assigned different container port configurations. This avoids the potential of using the wrong concentrated insecticide for a given application.

Other mixing apparatus could be used to provide specific modes of agitation by modifying the mixing unit. Another injector system could include a shaker platform to agitate the concentrate in the container prior to dilution. The concentrate container would be placed on the shaker unit and the container would be shaken to agitate the contents of the concentrate container prior to dilution.

In another injector system, the container could be designed for refilling with concentrated insecticide by the supplier of the insecticide.

A preferred embodiment of the injector system for water dilutable insecticidal formulations is described in FIG. 1. This injector system uses standard components and includes, for example, an optional recirculation pump, a container for the concentrated insecticide, a three way valve, an injector, a water stream and a water line for mixing, a dispensing nozzle with flow meter, and associated electrical connections, valving and hoses. Additionally, the system could include a selector switch controlling the three-way valve in the recirculation loop (to select between recirculation and dispensing) and a pressure gauge to monitor the water inlet pressure.

The injector system described in FIG. 1 includes two water injection pumps. These could include a DOSMATIC® injector available from Dosatron International, Rue Pascal-BP-6, 33370 Tresse (Bordeaux), France. The setting on the water injector pump is selected to correspond to the desired final concentration of water/insecticide to be prepared. For example, if a 10% volume/volume solution is desired, the injector pump is set according to the manufacturer's instructions. Following re-circulation to mix the concentrated insecticide, the water source coming to the injector system is turned on at the water inlet. The injector system is set to produce the desired concentration for the water/insecticide solution following the manufacturer's instructions for use of the water injector pump selected. The water injection pump continuously injects the proper amount of concentrated insecticide into the water stream. As the water stream exits the nozzle into the application equipment reservoir, the water diluted insecticide is ready for use. By incorporating two water injector pumps into the injection system, the concentration of the insecticide in water can be increased to twice the concentration possible utilizing a single water injection pump.

The injector system is designed to inject liquid into water and can be applied to a variety of other applications. Other chemicals can also be applied in a wide range of other applications, including irrigation, livestock hygiene and crop spraying.

The injector system mixes the concentrated insecticide, such as the FFAST™ formulated insecticide AQUA-RESLIN®, in proper proportions with water, and then dispenses the water diluted insecticide into application containers. End users then spray this water diluted insecticide to kill mosquito and other insects.

The injector system can be portable and can be placed in a location convenient for connection to a standard electrical outlet and water source.

The insecticidal formulations that can be used with the injector system are those insecticides that are suitable for dilution with water to form a space sprayable preparation. These insecticidal formulations generally comprise an active ingredient, an emulsifier and an evaporation retardant. The formulation can optionally contain a carrier or solvent for the active ingredient. The active ingredient in the formulation may be a pyrethroid or natural pyrethrins or other insecticide classes possibly combined with a synergist. Other active ingredients can include both non-biologically and biologically active compounds. For example, the active ingredients may be selected from insecticides alone or in combination with insecticides or biological larvicides or other active ingredients.

Carriers and solvents may include lower alkyl esters, lower ketones, lower alkanols, lower alkanes, kerosene, mineral oil, heptyl acetate, 4-methylpentan-2-one, or butane.

Emulsifier may include anionic compounds, such as calcium dodecyl benzene sulphate or sodium diisopropyl naphthalene sulphonate, and non-ionic compounds, such as polyoxyethylene stearyl ethers, polyoxyethylene monolaurates, polyoxyethylene mono-oleates, sorbitan mono-oleates, nonylphenol ethoxylate, polyethylene glycol, and blends of olyel ethoxylate and PEG20 glyceryl oleate.

An evaporation retardant may include any film-forming compound, preferably an alkanol and is preferably a primary alcohol with no more than one or two side substituents selected from methyl, ethyl, trifluoromethyl and halogen, with such substitutions preferably remote from the alcohol group (preferably at least 7 carbon atoms away from the hydroxyl group,) and preferably the alkanol is not substituted at all, preferably $C_{16-20}$, preferably saturated. Hexadecan-1-ol (also known as cetyl alcohol) is usually available commercially as a mixture with a minor proportion of octadecan-1-ol (stearyl alcohol) and such cetostearyl alcohol is satisfactory. Heptadecan-1-ol performs adequately. Other effective film forming agents include 1-hexadecylamine, 1-heptadecylamine and 1-octodecylamine. Less preferred film-forming agents include hexadecan-2-ol, 1,2-hexadecandiol, methyl stearate, stearyl acetate, methyl palmirate, and 1,2-octadecandiol. N-alkoxyalkanols may be used, for example $CH_3(CH_2)_{21}OC_2H_4OH$, $CH_3(CH_2)_{21}OCH_3H_6OH$, $CH_3(CH_2)_{17}OC_2H_4OH$, or $CH_3(CH_2)_{15}OCH_2H_4OH$, as may oxyethylene-docosanol and mixtures of any of the said evaporation retardants.

Such a formulation allows droplets to remain stable while drifting over a given swath area necessary to obtain effective coverage and to obtain and to maintain an optimum droplet size. For maximum impact, the droplets need to be sized within tight parameters: too big and they fall to the ground before reaching the target, too small and they may not impact the intended target, such as an insect. An example of such a formulation that allows water dilutable insecticide droplets (for example, the mosquito adulticide AQUA-RESLIN®) to remain stable with less evaporative loss is currently available under the name FFAST™. The mosquito adulticide AQUA-RESLIN® utilizes anti-evaporant technology which allows for the use of water as a diluent while maintaining a stable ULV droplet of an insecticide which allows the water droplets to perform the same, or very similar to the oil based solvent droplets. The benefits are many, including the almost complete elimination of oil as an environmental insult The AQUA-RESLIN® insecticide is a concentrated formulation of a water dilutable mosquito adulticide that can be provided by the manufacturer in a container can be installed onto the injector system. The process of the present invention mixes the formulation in its container, dilutes the insecticide, such as the AQUA-RESLIN® insecticide, by injecting the concentrated insecticidal formulation into a water stream to achieve a predetermined concentration, and dispenses the diluted insecticide into application equipment for subsequent dispersal. The container is connected to the injector system of the present invention, whereby the outlet of the container may or may not be connected to the recirculation loop of the injector system which is used for mixing the insecticide prior to dilution. Agitation and resuspension can be achieved by drawing the concentrated formulation out of the container, passing it through a recirculation pump, and then returning the concentrated formulation back into the container, or by any of the other methods previously described. Once homogenized, the insecticide is injected and mixed into the water stream of the injector system through the use of a water injection pump, which accurately dilutes and mixes the formulation with water. The water diluted insecticide is then dispensed by the injector system into application equipment for subsequent spraying.

In addition to the AQUA-RESLIN® insecticide, other FFAST™ insecticide formulations can include products such as AQUA-PYRENONE™, ESBIOL®, AQUA-SCOURGE™, and other products where the active ingredient in the formulation may be a pyrethroid or natural pyrethrins or other insecticide classes. AQUA-PYRENONE™ contains the active ingredient pyrethrins synergized with piperonyl butoxide, which can be applied undiluted or diluted with water and can be used for structural insect and pest control and as a ULV mosquito adulticide over crops. ESBIOL® contains the active ingredient S-bioallethrin combined with piperonyl butoxide and is also formulated in such a way as to be dilutable with water and can be used for structural pest control, food protection and as a ULV mosquito adulticide. AQUA-SCOURGE™ contains synergized resmethrin for ULV mosquito control.

As described above, oil was used in the past as a diluent for these formulations in order to prevent evaporation of the diluent during the application of droplets during spraying of the insecticide. The present invention includes formulations that allow for dilution with water and for forming stable droplets that remain intact during application without significant loss of water due to evaporation. These water diluted droplets further eliminate problems associated with the use of oils in general, such as the difficulty in handling, additional storage requirements for the oil, environmental concerns associated with handling of oils and safety issues. Accordingly, the present invention overcomes the problems inherent in insecticide formulations that must be diluted with oil.

The present invention further improves upon the prior art in that it includes a complete injector system for mixing, diluting and dispensing the water diluted formulations directly into the application equipment used to disperse insecticides. Some of the more notable benefits of the process and the injector system include:

Environmental, since the process and formulation minimizes oil in the environment and insures consistent dilution and minimizes the chance of over-application;

Economic, since the process and the formulation no longer requires the purchase of large quantities of oil for dilution, and the easy dilution using this process results in manpower time savings. There is also a quick turn around of trucks and aircraft tank refilling; and Safety, since the closed system minimizes worker contact with the insecticide and eliminates the hazards of storing flammable oils.

It will thus be seen that the objects set forth above, among those made apparent from the preceding description, are effectively attained. Since certain changes may be made in the injector systems detailed herein, as well as in carrying out the process described above, without departing from the scope of the invention, it is intended that all matter contained in this specification shall be interpreted as illustrative and not in a limiting sense.

All attachments, exhibits and referenced appended to provisional application Ser. No. 60/175,548 filed Jan. 11, 1999 are hereby incorporated by reference.

DETAILED DESCRIPTION OF THE DRAWINGS

Figure 1:
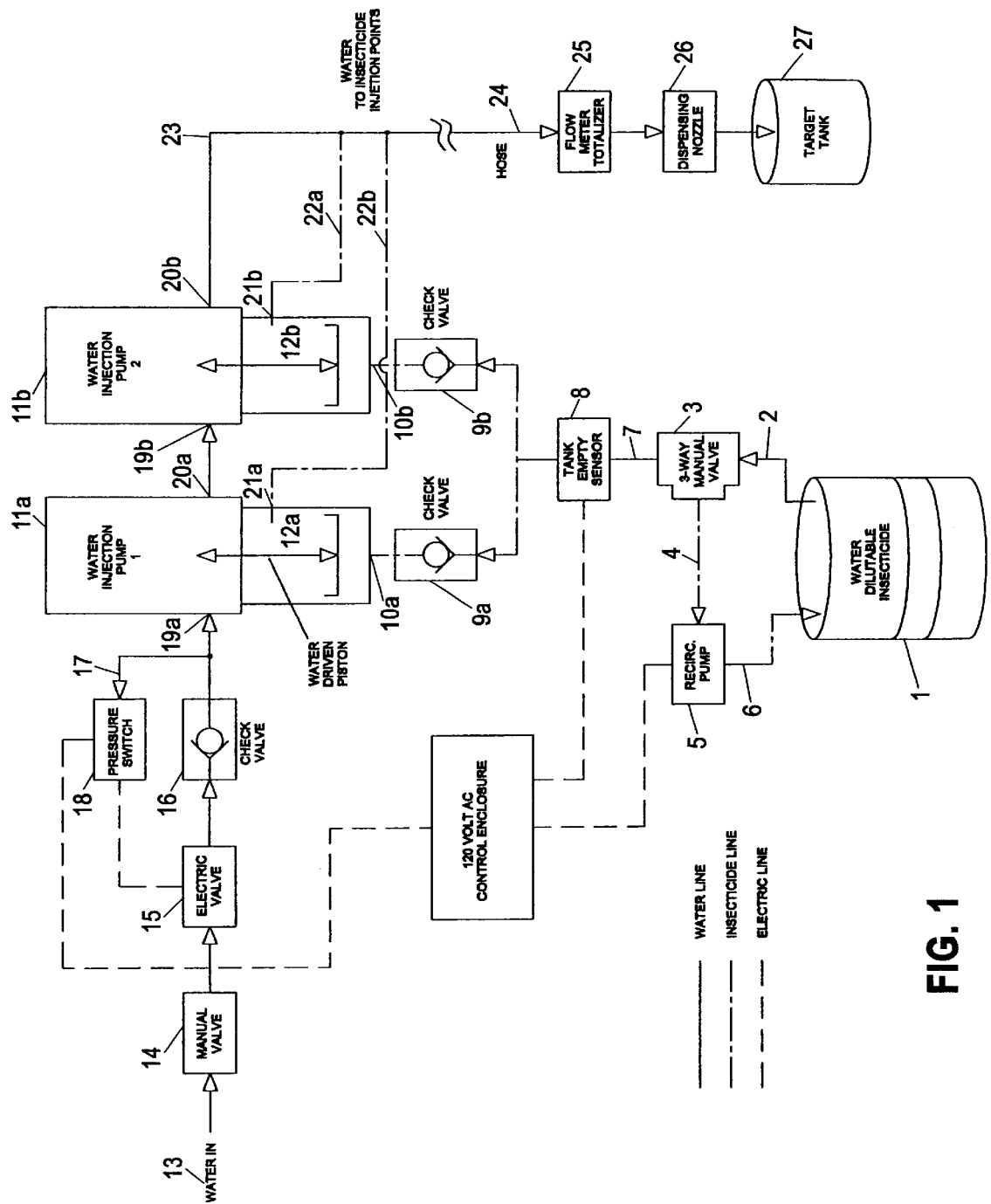
FIG. 1 is a schematic of the injector system in accordance with one embodiment of the present invention.

The overall operation of the injector system of one of the embodiments of the present invention will be described with reference to FIG. 1. This particular embodiment of the injector system includes: a container (1) for holding the water dilutable insecticide formulation; a recirculation loop including insecticide lines (2), (4), and (6), a recirculation pump (5) for mixing the concentrate by recirculation, and a three way valve (3) connected to the recirculation loop to divert flow of the concentrated water dilutable insecticide after mixing from the recirculation loop and container; two water injection pumps (11a) and (11b) connected to a water source (13) and the three way valve (3) of the recirculation loop; a water stream flowing through the water injector pumps (11a) and (11b) and passing into water line (23), which includes individual connections for water dilutable insecticide lines (22a) and (22b) and wherein the water dilutable insecticide is mixed with water; and a hose (24) and dispensing nozzle (26) through which the water diluted insecticide is dispensed into the target tank (27) of the application equipment.

The process begins by mixing the concentrated water dilutable insecticidal formulation in the container (1). In the injector system depicted in FIG. 1, mixing is accomplished by recirculating the concentrate in the recirculation loop connected to the container (1). The recirculation loop includes insecticide line (2) connected to the outlet of the container (1) and the three-way valve (3). The three-way valve (3) can be oriented to keep the flow of concentrated water dilutable insecticide in the recirculation loop by directing flow to insecticide line (4) or can be oriented to divert the flow of the concentrated water dilutable insecticide from the recirculation loop into the injector system through insecticide line (7). When the three-way valve (3) is oriented to keep the flow of insecticide formulation in the recirculation loop, the insecticide is pumped through this loop by recirculation pump (5). The recirculation pump (5) is connected to the inlet of the container through insecticide line (6). Recirculation continues until mixing is complete and the three-way valve (3) is switched from the recirculation flow direction to the bypass flow direction.

Once the water dilutable insecticide has been mixed according to the manufacturer's instructions, the three-way valve (3) is set to divert the flow of the insecticide into the remainder of the injector system for dilution with water. A water source (13) is connected to the injector system and can be any pressurized water source including a standard connection to a municipal water supply. Water provided by the water source (13) is directed into one inlet of a water injection pump. The concentrated water dilutable insecticide from container (1), which is diverted from the recirculation loop through the three-way valve (3), is directed to the other inlet of a water injection pump. Water is directed through the water injection pump and passes through a water outlet port which is connected to a water line (23) and dispensing hose (24). The water dilutable insecticide is simultaneously metered from the water injection pump by a water driven piston through a water dilutable insecticide outlet port and is injected into the water line (23) connected to dispensing hose (24). At this point, the water dilutable insecticide is diluted with water as the formulation is injected into the water stream in water line (23).

The embodiment detailed in FIG. 1 includes two water injector pumps (11*a*) and (11*b*), each with individual water dilutable insecticide inlet ports (10*a*) and (10*b*) and outlet ports (21*a*) and (21*b*), water inlet ports (19*a*) and (19*b*) and outlet ports (20*a*) and (20*b*), and water driven pistons (12*a*) and (12*b*). In the injector system depicted in FIG. 1, a single water stream passes through the two water injection pumps (11*a*) and (11*b*) which are connected in series. The water source (13) is connected to the injector system such that a water stream passes through the water inlet (19*a*) of the first water injection pump (11*a*). The water stream flows from the water outlet (20*a*) into the water inlet (19*b*) of the second water injection pump (11*b*) and passes through the water outlet (20*b*) of the second injection pump (11*b*) into water line (23).

The insecticide fluid streams passing through water injection pumps (11*a*) and (11*b*) are not connected in series and include individual water dilutable insecticide lines (22*a*) and (22*b*) connected to the water line (23). These individual insecticide lines (22*a*) and (22*b*) are used to inject the water dilutable insecticide into the water stream. Check valves (9*a*) and (9*b*) can be placed in insecticide line (7) between the three-way valve (3) and the insecticide inlet ports (10*a*) and (10*b*) of the water injection pumps (11*a*) and (11*b*). Additionally, a check valve (16) can be placed between the water source (13) and the water inlet port (19*a*) of the first water injection pump (11*a*).

After injecting the water dilutable insecticide formulation into the water stream in water line (23), the final water diluted insecticide passes through the dispensing hose (24) and is ready for dispensing into a variety of target tanks (27). The configuration of the target tank is determined by the application equipment for the final water diluted insecticide. The dispensing nozzle (26) can be designed to accommodate a variety of target tank (27) configurations.

Optional process control and measurement equipment utilized in the injector system depicted in FIG. 1 includes: a tank empty sensor (8) for sensing concentrated water dilutable insecticide in insecticide line (7) coming from the container (1); a manual valve (14) isolating the water source (13) from the injector system; a water bypass line (17) coupled to a pressure switch (18) and an electric valve (15), to further control the water pressure and flow from the water source (13); and a flow meter totalizer (25) connected to the dispensing hose (24) for measuring the amount of water diluted insecticide dispensed into the target tank (27).

All of the components of the injector systems described in FIG. 1 are commercially available and require no additional description herein While the present invention has been disclosed in terms of a preferred embodiment in order to facilitate a better understanding thereof, it should be appreciated that the invention can be embodied in various ways without departing from the principle of the invention. Therefore, the invention should be understood to include all possible embodiments and modifications to the shown embodiment without departing from the principle of the invention as set forth in the appended claims.

We claim:

1. An injector system for preparing a water dilutable insecticidal formulation which comprises:

a container having an inlet and an outlet for holding the water dilutable insecticidal formulation prior to dilution with water;

a mixing system for mixing the water dilutable insecticidal formulation in the container prior to dilution comprising a recirculation pump, fluid lines connecting the outlet of the container to the recirculation pump and connecting the recirculation pump to the inlet of the container forming a recirculation loop for recirculating the water dilutable insecticidal formulation through the recirculation loop and the container, and a valve in the recirculation loop between the container and the recirculation pump for diverting the water dilutable insecticidal formulation from the recirculation loop and the container to a water injection pump;

a water source;

the water injection pump comprising a water inlet port, a water outlet port, a water dilutable insecticidal formulation inlet port, and a water dilutable insecticidal formulation outlet port, wherein the water inlet port is connected to the water source providing a water stream passing through the outlet of the water injection pump, wherein the water dilutable insecticidal formulation inlet port is connected to the valve for diverting the flow from the recirculation loop providing a fluid stream for the water dilutable insecticidal formulation passing through the water dilutable insecticidal formulation outlet of the water injection pump;

a water line connecting the water outlet port of the water injector pump to a dispensing system;

a fluid line connecting the water dilutable insecticidal formulation outlet of the water injection pump and the water line, whereby the water injector pump injects a predetermined amount of the water dilutable insecticidal formulation into the water stream forming a final water diluted insecticidal formulation; and the dispensing system connected to the water line for dispensing the water diluted insecticidal formulation into application equipment comprising a dispensing nozzle, and a hose connecting the water line to the dispensing nozzle.

2. The injector system of claim 1, wherein the water injection pump further comprises a water driven piston for injecting the predetermined amount of the water dilutable insecticidal formulation into the water line for dispensing the final water diluted insecticidal formulation.

3. The injector system of claim 1, wherein the dispensing system for the water diluted insecticidal formulation further comprises a flow meter totalizer.

4. The injector system of claim 1, wherein the water source further comprises:

a check valve, a pressure reducer, optionally, and a pressure gauge.

5. The injector system of claim 1, wherein the inlet and outlet of the container holding the water dilutable insecticidal formulation differentiates between different types of water dilutable insecticidal formulation in the container.

6. The injector system of claim 1, wherein the container further comprises:

a tamper evident device, and the container is refillable.

7. An injector system for preparing a water dilutable insecticidal formulation which comprises:

a container having an inlet and an outlet for holding the water dilutable insecticidal formulation prior to dilution with water;

a rotary mixer for mixing the water dilutable insecticidal formulation prior to dilution connected to the container comprising a mixing head, a motor for rotating a shaft, and the shaft connected to the mixing head and a coupling for connecting the shaft to the motor, whereby the mixing head is inside the container, the shaft passes through the container, and the coupling for connecting the shaft to the motor is outside the container;

a water source;

the water injection pump comprising a water inlet port, a water outlet port, a water dilutable insecticidal formulation inlet port, and a water dilutable insecticidal formulation outlet port, wherein the water inlet port is connected to the water source providing a water stream passing through the outlet of the water injection pump, wherein the water dilutable insecticidal formulation inlet port is connected to the outlet of the container and provides a fluid stream of the water dilutable insecticidal formulation passing through the water dilutable insecticidal formulation outlet of the water injection pump;

a water line connecting the water outlet port of the water injector pump to a dispensing system;

a fluid line connecting the water dilutable insecticidal formulation outlet port of the water injector pump and the water line, whereby the water injector pump injects a predetermined amount of the water dilutable insecticidal formulation into the water stream and forms a final water diluted insecticidal formulation; and the dispensing system connected to the water line for dispensing the water diluted insecticidal formulation into application equipment comprising a dispensing nozzle, and a hose connecting the water line to the dispensing nozzle.

8. The injector system of claim 7, wherein the water injection pump further comprises a water driven piston for injecting the predetermined amount of the water dilutable insecticidal formulation into the water line for dispensing the final water diluted insecticidal formulation.

9. The injector system of claim 7, wherein the dispensing system for the water diluted insecticidal formulation further comprises a flow meter totalizer.

10. The injector system of claim 7, wherein the water source further comprises:

a check valve, a pressure reducer, optionally, and a pressure gauge.

11. The injector system of claim 7, wherein the inlet and outlet of the container holding the water dilutable insecticidal formulation differentiates between different types of water dilutable insecticidal formulation in the container.

12. The injector system of claim 7, wherein the container further comprises:
a tamper evident device, and
the container is refillable.

13. A process for preparing a water dilutable insecticidal formulation which comprises:
mixing the water dilutable insecticidal formulation in a container prior to passing the water dilutable insecticidal formulation through an injector system for dilution with water;
passing the mixed water dilutable insecticidal formulation from the container to a water injection pump;
providing water to the water injection pump and forming a water stream through the water injection pump;
passing the water stream through the water injection pump into a dispensing system;
diluting the water dilutable insecticidal formulation by adding a predetermined amount of the water dilutable insecticidal formulation from the water injection pump to the water stream and forming a water diluted insecticidal formulation; and
dispensing the water diluted insecticide with the dispensing system into a target tank.

* * * * *